(12) United States Patent
McCarthy et al.

(10) Patent No.: US 10,306,314 B2
(45) Date of Patent: *May 28, 2019

(54) SYSTEM, METHOD AND DEVICE FOR PROVIDING A MOBILE APPLICATION ACROSS SMARTPHONE PLATFORMS TO ENABLE CONSUMER CONNECTIVITY AND CONTROL OF MEDIA

(71) Applicant: COX COMMUNICATIONS, INC., Atlanta, GA (US)

(72) Inventors: Michael Joseph McCarthy, Marietta, GA (US); Keith Alan Rothschild, Dunwoody, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,383

(22) Filed: Feb. 29, 2016

(65) Prior Publication Data

US 2016/0241912 A1 Aug. 18, 2016

Related U.S. Application Data

(63) Continuation of application No. 12/963,945, filed on Dec. 9, 2010, now Pat. No. 9,277,292.

(51) Int. Cl.
| | |
|---|---|
| *H04N 5/44* | (2011.01) |
| *H04H 20/38* | (2008.01) |
| *H04N 21/45* | (2011.01) |
| *H04N 21/81* | (2011.01) |
| *H04N 21/258* | (2011.01) |
| *H04N 21/414* | (2011.01) |

(Continued)

(52) U.S. Cl.
CPC ........ *H04N 21/4516* (2013.01); *H04H 20/38* (2013.01); *H04N 5/4403* (2013.01);
(Continued)

(58) Field of Classification Search
CPC ............ H04N 21/4516; H04N 5/4403; H04N 21/2543; H04N 21/25875;
(Continued)

(56) References Cited

U.S. PATENT DOCUMENTS

| | | |
|---|---|---|
| 6,725,303 B1 | 4/2004 | Hoguta et al. |
| 8,549,578 B2 | 10/2013 | Herigstad et al. |

(Continued)

FOREIGN PATENT DOCUMENTS

| | | |
|---|---|---|
| EP | 1 853 061 A1 | 11/2007 |
| WO | 2009/143608 A1 | 12/2009 |

*Primary Examiner* — Alfonso Castro
(74) *Attorney, Agent, or Firm* — Merchant & Gould

(57) ABSTRACT

A system, method and device for providing a mobile application across smart phone platforms to enable consumer connectivity and control of media. The viewing experience of the individual is improved by the added control and the advertising experience is enhanced by ensuring advertisements are relevant and actionable. A system for providing interactivity between a mobile device and content includes a content provider providing content for presentation on a display device and a mobile device configured with a media management module communicating to provide user interactivity with the content. The media management module enables individualized consumer media services for the mobile device.

18 Claims, 7 Drawing Sheets

(51) Int. Cl.
*H04N 21/439* (2011.01)
*H04N 21/475* (2011.01)
*H04N 21/2543* (2011.01)
*H04N 21/4788* (2011.01)

(52) U.S. Cl.
CPC ... *H04N 21/2543* (2013.01); *H04N 21/25875* (2013.01); *H04N 21/25891* (2013.01); *H04N 21/41407* (2013.01); *H04N 21/4394* (2013.01); *H04N 21/4753* (2013.01); *H04N 21/4788* (2013.01); *H04N 21/812* (2013.01); *H04N 21/8186* (2013.01); *H04N 2005/441* (2013.01)

(58) Field of Classification Search
CPC ....... H04N 21/25891; H04N 21/41407; H04N 21/4394; H04N 21/4753; H04N 21/4788; H04N 21/812; H04N 21/8186; H04N 2005/441; H04H 20/38
USPC .......................................................... 725/9
See application file for complete search history.

(56) References Cited

U.S. PATENT DOCUMENTS

| | | |
|---|---|---|
| 9,277,292 B2* | 3/2016 | McCarthy .............. H04H 20/38 |
| 2003/0126611 A1 | 7/2003 | Chernock et al. |
| 2006/0149630 A1 | 7/2006 | Elliott et al. |
| 2006/0205410 A1 | 9/2006 | Black |
| 2007/0162502 A1 | 7/2007 | Thomas et al. |
| 2007/0276925 A1 | 11/2007 | La Joie et al. |
| 2008/0002021 A1 | 1/2008 | Guo et al. |
| 2008/0022298 A1 | 1/2008 | Cavicchia |
| 2009/0081950 A1 | 3/2009 | Matsubara et al. |
| 2009/0298535 A1* | 12/2009 | Klein ................ H04N 21/43615 455/556.1 |
| 2010/0013997 A1 | 1/2010 | Hwang |
| 2010/0031296 A1 | 2/2010 | Elias et al. |
| 2010/0119208 A1* | 5/2010 | Davis ..................... H04N 5/765 386/291 |
| 2010/0218211 A1* | 8/2010 | Herigstad .............. H04N 7/163 725/34 |
| 2010/0241699 A1* | 9/2010 | Muthukumarasamy .................... G06F 17/30035 709/203 |
| 2010/0251280 A1 | 9/2010 | Sofos et al. |
| 2010/0251292 A1 | 9/2010 | Srinivasan et al. |
| 2010/0293598 A1* | 11/2010 | Collart .............. G06F 17/30056 726/3 |
| 2010/0305729 A1* | 12/2010 | Glitsch ............. G06F 17/30026 700/94 |
| 2012/0017237 A1 | 1/2012 | Pan |
| 2012/0131098 A1 | 5/2012 | Wood et al. |

* cited by examiner

SYSTEM, METHOD AND DEVICE FOR PROVIDING A MOBILE APPLICATION ACROSS SMARTPHONE PLATFORMS TO ENABLE CONSUMER CONNECTIVITY AND CONTROL OF MEDIA

CROSS REFERENCE TO RELATED APPLICATION

This application is a continuation of application Ser. No. 12/963,945, filed Dec. 9, 2010, and assigned U.S. Pat. No. 9,277,292, which application is incorporated herein by reference in its entirety.

FIELD OF THE INVENTION

This disclosure relates in general to the management of media by consumers, and more particularly to a system, method and device for providing a mobile application across smart phone platforms to enable consumer connectivity and control of media.

BACKGROUND

Currently viewers of TV and other media have no intuitive way to collect and organize product opportunities as they are presented to them. In addition, consumers do not have an electronic method of organizing those promotions on a retail level.

As the smart phone achieves commonplace and customary status in the lives of individual consumers around the world, it simultaneously introduces the ability to radically disrupt the traditional media model. That model previously consisted of a one-way broadcast to the mass market with limited understanding and no interactivity. Now a more optimal model that is bi-directional, focused on an individual consumer's needs and desires, and permits new consumption behaviors, and which may be discretely controlled by the entities who own this "channel" to the consumer is possible. Individuals are not able to connect their smart phones to their entertainment media viewing experiences, although a very high percentage of users are using their phone in all other aspects of their day-to-day lives. The mobile device is no longer just a way to receive or make voice communications with others, it is a way to communicate in short messaging (texting), send and receive email, enjoy video while on the move, play games and organize their lives (thru applications). But in today's world, users cannot effectively manage their media thru this now ubiquitous device.

There are over twenty million unique smart phone subscribers in the current market. Smart phones possess the ability to run third party applications in a mobile device with a wireless and/or Internet data connection. Smart phones are overtaking the existing install base as mobile provider contracts renew. All of the research to date confirms that the smart phone will dominate in the foreseeable future and provide a reliable platform for the software product itself.

Mainstream consumer interests are not rapidly adopting high-end televisions and cable set-top boxes due to cost and limited additional benefits provided by the high cost. For cable companies themselves, the cost of the existing cable set-top boxes is one of their largest installed assets. The lowest common denominator for the mainstream is a typical television (regardless of screen type) and infrared remote control. This television and infrared remote arrangement will dominate into the foreseeable future and provide the base requirement for the product environment.

Consumers are increasingly fickle and spend greater amounts of recreation time on the Internet with social networking. Consumers want recommendations and variety and ease of use. They want to participate, communicate with friends, and buy when it fancies them. Further, they want to do everything reasonably possible on the smart phone platform—from banking, to map navigation, to newspapers, to weight loss applications.

Accordingly, there is a need for a system, method and device for providing a mobile application across smart phone platforms to enable consumer connectivity and control of media.

SUMMARY OF THE INVENTION

To overcome the limitations described above, and to overcome other limitations that will become apparent upon reading and understanding the present specification; embodiments for a system, method and device for providing a mobile application across smart phone platforms to enable consumer connectivity and control of media are disclosed.

The above-described problems are solved by providing a device that improves the viewing experience for the individual and enhances the advertising experience by ensuring advertisements are relevant and actionable.

In one embodiment, a system for providing interactivity between a mobile device and content includes a content provider for providing content for presentation on a display device and a mobile device configured with a media management module for communicating to provide user interactivity with the content provided by the content provider and presented on the display device.

In another embodiment, mobile device for controlling user interaction with content is disclosed. The mobile device includes memory for storing data and a processor for processing the data, the processor further being configured to provide a media management module for communicating to provide user interactivity with content provided by a content provider and presented on a display device.

In another embodiment, method for providing user interactivity with content provided by a content provider and presented on a display device using a mobile device is disclosed. The method includes initiating a media management module on a mobile device, presenting content on a display device and using the media management module on the mobile device to provide user interactivity with the content presented on the display device.

In another embodiment, a computer readable medium including executable instructions which, when executed by a processor, provides user interactivity through a mobile device with content provided by a content provider and presented on a display device is disclosed. The instructions executed by the processor for providing user interactivity through a mobile device with content provided by a content provider and presented on a display device include providing a media management module on a mobile device to enable communication to support user interactivity with content provided by a content provider and presented on a display device, initiating the media management module on the mobile device, presenting content on the display device and using the media management module on the mobile device to communicate with the conditional access device to provide user interactivity with the content presented on the display device.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a mobile application that can be implemented on multiple smart phone platforms and which enables consumer to connect a mobile device to their preferred TV viewing experience. A media management module enables individualized consumer media services to a mobile device. The media management module is downloaded to the mobile device and subscribers are guided through a registration process. Configuration may be controlled to identify the subscriber associated with the mobile device, and what media environments the subscriber wants to control (STB, analog TV, etc.). The mobile device may also detect other devices that may be used with the provided services, e.g., a STB, a DVD player, a DVR, etc. The device may also identify other remote control devices. Profile preferences are stored so a guide may be produced that is specific to the subscriber. Advanced customization features of the mobile application are provided across the smart phone platform. The mobile device may not only act as a remote control device, but may also be configured to enable targeted advertising and TV-commerce opportunities based on knowledge of consumer activity.

Figure 1:
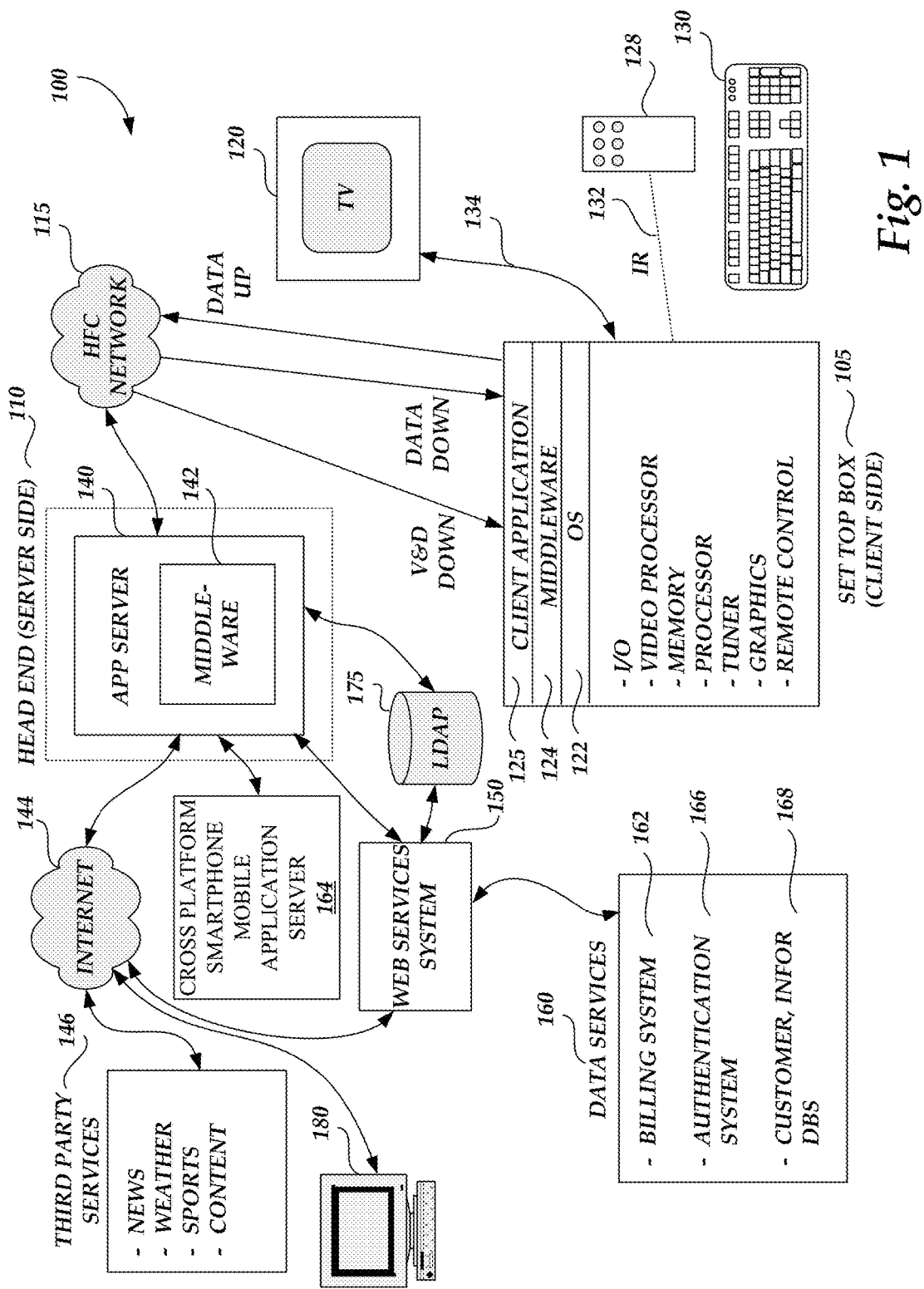
FIG. 1 is a simplified block diagram illustrating a cable television/services system architecture that serves as an exemplary operating environment for the present invention.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (APIs) that are exposed to client applications 126 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention; the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates within a predetermined frequency range, e.g., 54 MHz-1 GHz. Those skilled in the art will recognize that "in-band" signaling is a term that refers to the distribution of data in the same carriers that are used to distribute video signals. The signaling space in the predetermined frequency range of the "in band" signaling is generally divided into channels in which may be transmitted a single analog signal or a greater number of digital signals.

The data downlink and the data uplink, illustrated in FIG. 1, between the HFC network 115 and the set-top box 105 comprise "out of band" data links. As is understand by those skilled in the art, the "out of band" frequency range generally lies in a frequency range that is selected to be significantly different from the frequency band for the "in band" signaling used to distribute video signals. According to embodiments of the present invention, data flow between the client-side set-top box 105 and the server-side application server 140 is typically passed through the "out of band" data links. Alternatively, an "in band" data may be provided in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client. For example, the application server 140 via the middleware layer 142 may obtain data from third-party services 146 via the Internet 140 for transmitting to a customer through the HFC network 115. For example, a weather report from a third-party weather service may be downloaded by the application server via the Internet 144. When the application server 140 receives the downloaded weather report, the middleware layer 142 may be utilized to format the weather report for receipt and use by the subscriber.

According to one embodiment of the present invention, data obtained and managed by the middleware layer 142 of the application server 140 may be formatted according to the Extensible Markup Language and passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 may obtain customer support services data, including billing data, information on customer work order status, answers to frequently asked questions, services provider contact information, and the like from data services 160 for provision to the customer via an interactive television session. As illustrated in FIG. 1, the services provider data services 160 may include a number of services operated by the services provider of the CATV system 100 including data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A cross-platform smart phone mobile application server 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
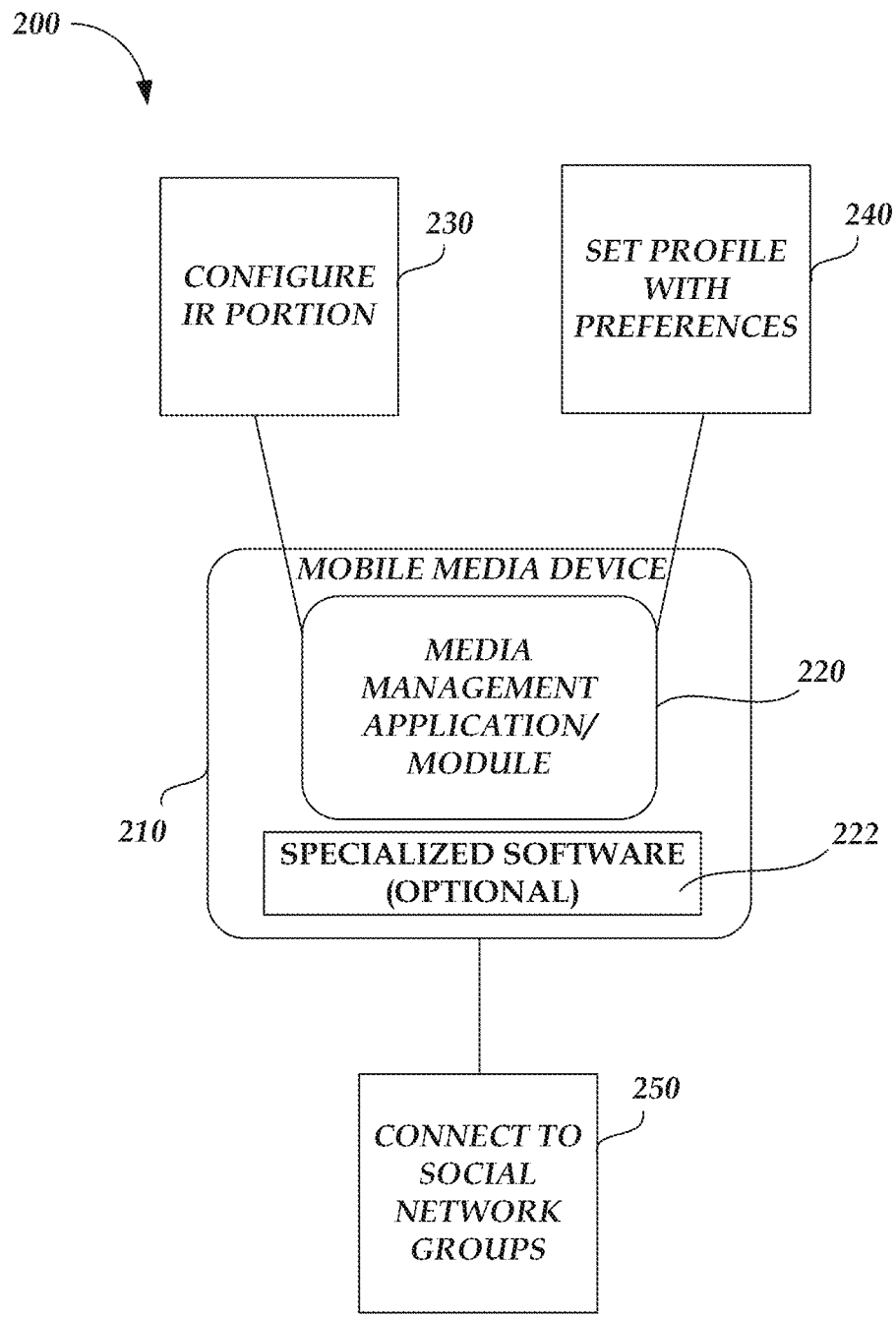
FIG. 2 shows a simple block diagram of the media management application setup from a subscriber's view according to one embodiment.

FIG. 2 shows a simple block diagram of the media management application setup from a subscriber's view 200 according to one embodiment. A mobile device 210, such as a smart phone, IPod, Archos Internet tablet, tablet PC, mobile slate device, etc., may be configured with a media management application or module 220. The media management application 220 supports a "shopping cart" type model where a consumer would pick the shows of interest, and share general preferences for viewing recommendations. Based on demographic data (zip code and local network provider), the user can immediately target what channels and shows are available to them and when. Once the user tells the product what sort of TV they possess, the smart phone can then act as the remote control. As part of the product, each smart phone would get an infrared converter (from WiFi or Bluetooth which smart phones are enabled for) to handle wireless translation. The IR device needs to blend seamlessly with the smart phone running the application. It should be capable of being 'remoted' from the phone (placed in cradle in viewing room or in the home theater control room). The infrared television codes for most TV systems are generally available and can be quickly configured.

Accordingly, the user is able to easily download a media management application 220 to their smart phone 210. In addition, the user will configure the video devices that are in the home or domain with the intuitive interface 230, personalize their configuration for their particular preferences 240, and connect to social network groups 250 to share media preferences, e.g., TV and movie preferences, or subscribe to a group for suggested content. It must be easy for customers to set their preferred channels, media sources, and devices to control. Customers need to opt-in on services to receive suggestions or group suggestions. In addition, a very clear privacy policy needs to be made available to customers.

The IR portion 230 of the media management application must be very easy to configure. One way for this device to be easily configured is for the customer to enter in all of the device models that they have and the back-office could look up their IR signals. An alternative way would be to put the application in "learn mode" and have the consumer use their traditional remotes to control their in home devices. Once the application has listened to the IR in the room, it will look up all devices that use those captured IR signals. The user will have to answer a series of questions so the application can figure out what devices are in the room—"did your TV just turn off?" Once a careful list of questions and responses are collected, the IR component will be automatically programmed.

The application and corresponding hardware may be provided to the subscriber without charge. Monetization may be achieved through advertising displayed on the mobile smart phone. Accordingly, a broad deployment is preferable because a single service provider may not reach a sufficient size of audience to generate a profit. In addition, a specialized application 222 may also be loaded onto the smart-device to support additional functions.

Figure 3:
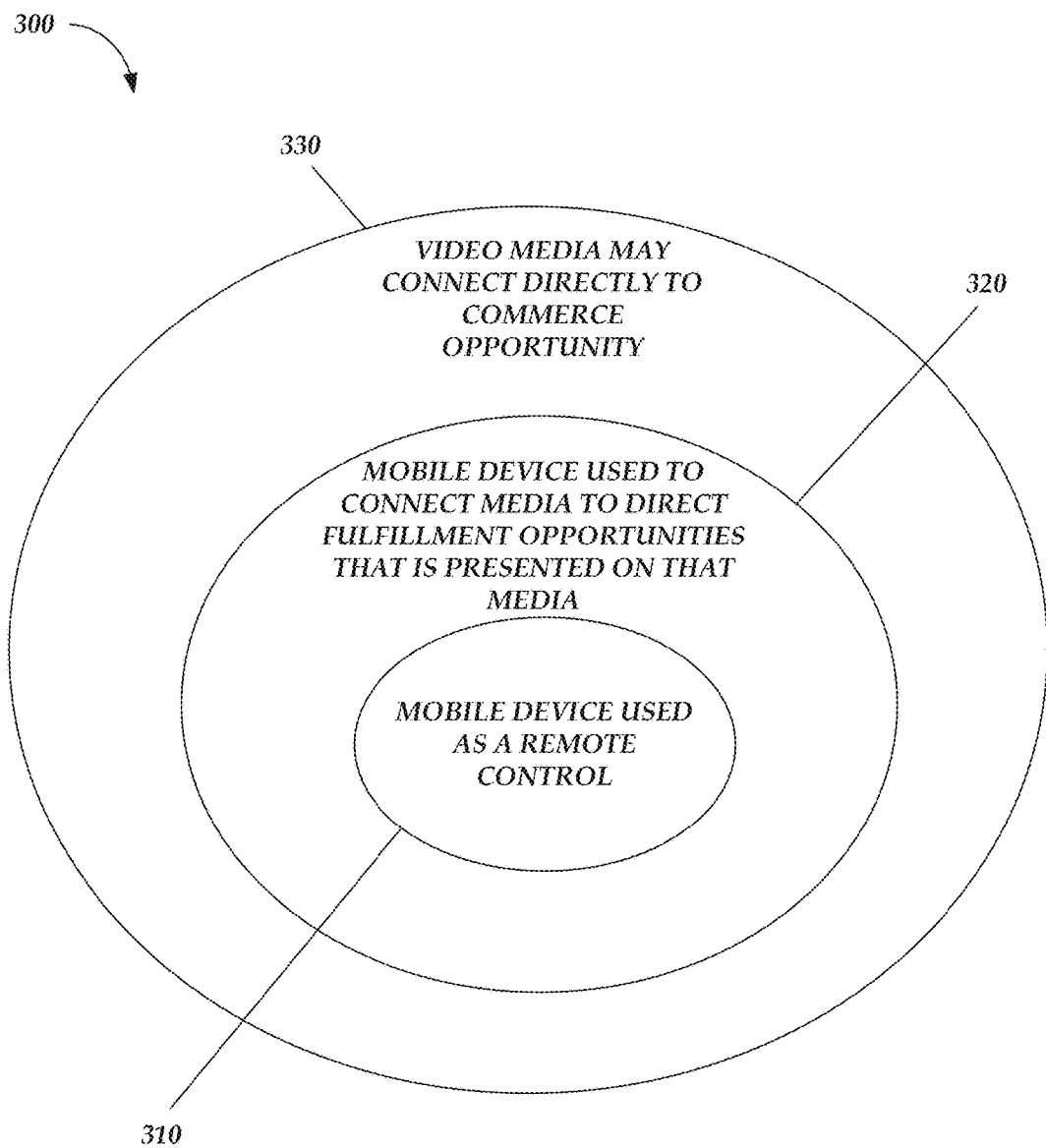
FIG. 3 shows the feature sets of media management enabled through mobile devices according to one embodiment.

FIG. 3 shows the feature sets of media management enabled through mobile devices (e.g., a smart phone or other G3 enabled device) 300 according to one embodiment. Mobile devices may be configured to be used as a remote control for your TV viewing experience 310. They may then be used to connect media to direct fulfillment opportunities that is presented on that media 320. In addition, video media may connect directly to a commerce opportunity 330. Each of these has their very distinct advantages that video media marketing has been trying to take advantage of for many years. Creating a return path between the mobile device and a nationally available data repository will allow content providers and advertisers the ability to measure the opportunity and reach of their messaging at an individual basis instead of being limited to household-level tracking (via Nielsen).

Subscribers may use their mobile device 310 to control the TV, playback device (DVD, blue-ray player) or cable-box, etc. The personalized guide on the smart phone will not only control their TV service provider's content, but personal content, Internet-based streamed content or locally stored content (a DVD or Netflix downloaded content). Imagine sitting down in the evening to view TV entertainment and opening an application on your cell phone that will not only tell you what is on your 12 most favorite network programmers, but will suggest other content as communicated in your user profile preferences. The software would also be able to infer crossover referrals to content that the user forgot to add to their profile. It is also possible to have other persons sitting in the same room to have a different set of suggestions. A different person in the room may notice that a new movie is available on the family multi-disc DVD player giving them an equal voice the TV viewing options. As a result of this level of information being controlled by the wireless device, the media smart phone device will have invaluable information in its data base that could be leveraged or sold to third parties. The company would keep all of this information in centralized data bases and make it readily available upon command.

The second feature set 320 of this product would allow networks to know when subscribers are viewing their content and offer interactivity to either the show or ads in the programming. Consider that an individual has tuned to the popular show American Idol. There will be direct voting opportunities in real-time during the show or the media management software could understand that the individual is watching the show time shifted from DVR and as such allow voting while they watch the recording. This level of knowledge could be leveraged in several methods:

Allow networks to enable polling during the live broadcast of a show.

Promotion of next week's show or some other ABC content.

Provide different promotions for the real-time viewing of the show verses the time delayed for some sponsor.

Provide information to the network to inform them the number of time shifted viewers.

Request for information fulfillment should be available (Coupons or product info—this could be used for the pharmaceutical industry).

The third feature set 330 enables direct connection of your video consumption experience with opportunities of direct purchase. It could be as simple as an SMS keyword for ordering a book based on an ad in the network stream from Amazon or something more complicated like the software noticing you are starting a movie off your blue-ray on a Friday night and offering a pizza from your local pizza shop.

Figure 4:
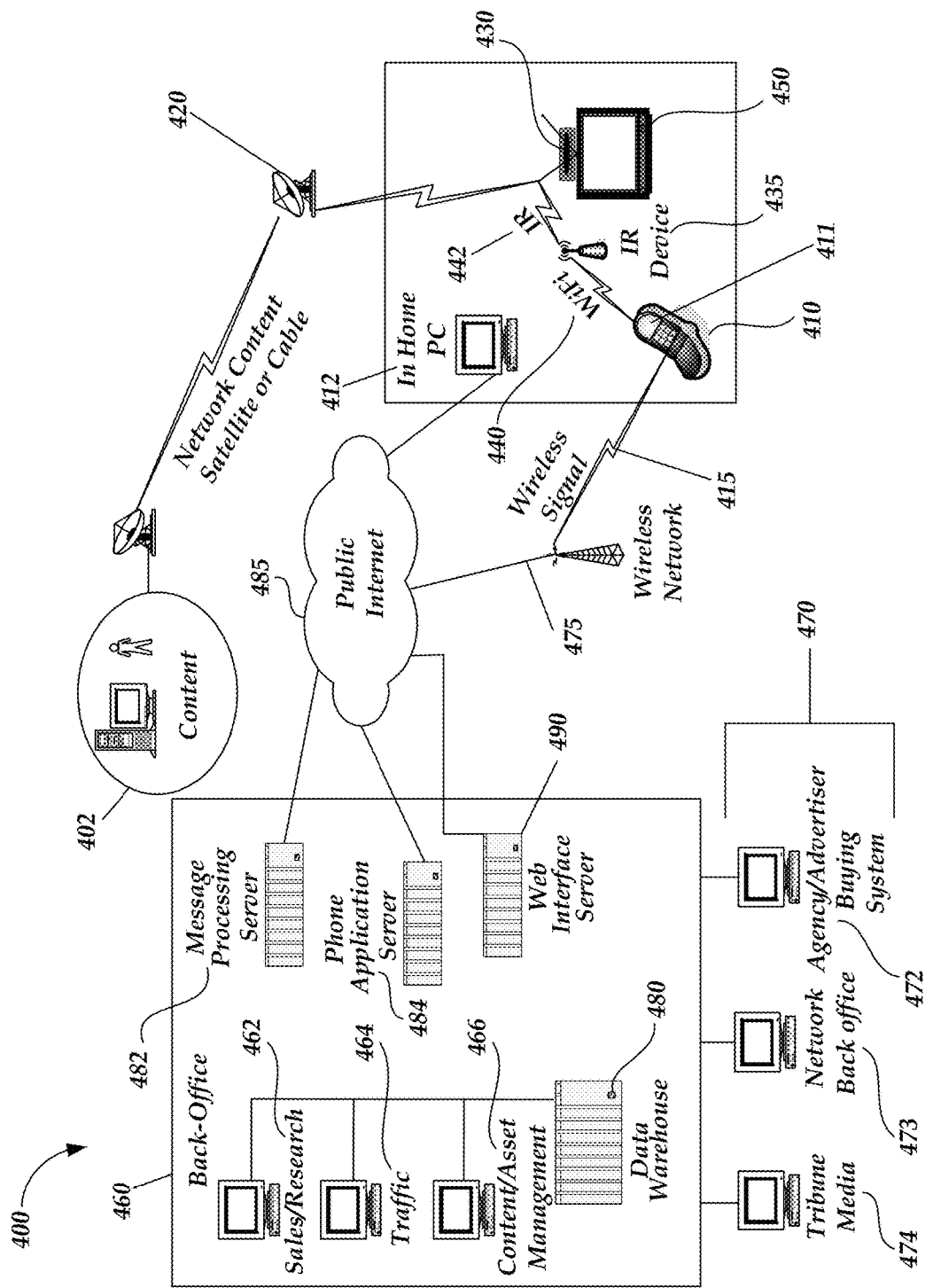
FIG. 4 is a simplified block diagram illustrating the media management architecture according to one embodiment.

FIG. 4 is a simplified block diagram illustrating the media management architecture 400 according to one embodiment. Content producers create programming and content that is distributed through content distributors to broadcasters, cable and other network operators for sale and distribution to viewers. In FIG. 4, content 402, whether from content generators, content providers, or other sources, is provided to a distribution network 420. The distribution network 420 may be provided by cable operators, satellite operators, telecommunication operators, etc. using satellite and/or terrestrial broadcast networks. Herein, content provider will be used in a general sense to refer to any entity involved with providing content to a consumer.

The content 402 may be provided to consumers that use a wide variety of different devices to watch and/or listen to the delivered content 402. The content 402 may be provided through a conditional access device 430, such as a set-top box, to enable the network operators to charge subscribers for the content 402. However, a conditional access device is not necessary. For example, the content may be viewed on an in-home display device 450, such as a television, a mobile device 410, an in-home personal computer (PC) 412, etc. The mobile device 410 may be configured with a media management module 411 and the mobile device 410 may be registered with a network operator that provides the distribution network 420. Thus, the mobile device 410 may therefore interact with the conditional access device 430. The signaling may also be provided via WiFi or over a cellular network.

The media management module 411 enables the mobile device 410 to access the conditional access device 430 to view content 402. Through the media management module 411, subscribers may manage their media consumption and experiences.

The mobile device 410 may have access to a wireless network 475, such as a cellular telecommunications network via a wireless signal 415. The mobile device may include a WiFi transceiver (not shown) to establish WiFi communication 440 with a repeater 435 (IR device), which in turn communicates with STBs 430 via an IR signal 442. The WiFi signal 440 is converted to an IR signal 442 that is used to control access to content for the subscriber's TV 450. The mobile device 410 tracks the program the subscriber is watching through the functional relationship with the STB 430 through communication using the IR device 435. The back office 460 gathers and maintains subscriber related intelligence. For example, the back office 460 may determine that the subscriber is associated with a subscription plan and identify the current environment of the subscriber.

The back office 460 media channel content information may be gathered as it is common domain information, i.e., what is being shown on what channel at what time. Once the system has identified this type of information via external systems 470, which may include third parties such as an advertiser 472, wherein advertisements may placed on a particular program in an overlay. The external systems 470 also may include a network back office 473 and media sources 474, such as Tribune Media Services.

As a specific example, a subscriber may be in the living room watching program A using the mobile device 410 as a remote control device. The traditional advertising may not necessarily be playing in the segments with program A. A different type of targeted advertising, i.e., supplemental information, may be provided to the mobile device 410 depending on what type of advertisement the consumer has been determined to react to. Additionally, a particular advertisement may be shown through the STB 430 and the subscriber may access their mobile device 410 to access the Web Interface Server 490 provided for downloading a brochure associated with the product shown in the advertisement. Thus, the mobile device 410 and content shown on the subscriber's television 450 may be synchronized or correlated. The mobile device 410 may act as an interactive guide without having to launch an interactive guide on the television 450 using an overlay to program A. A phone application server 484 couples the smart phone or mobile device to the back office to allow a user to establish preferences associated with the mobile device, process user data to analyze preferences associated with the mobile device and to provide recommendations based on the identified tendencies.

A return path from the STB 430 to the back office is unnecessary for this specific example. Additionally, distribution network 420 may be bypassed when the mobile device is used to respond to any advertisement thereby enabling these services to be provided and/or licensed independently. The entity that processes the advertisement response can be a centralized clearing house, which may be independent of the service provider.

Information associated with a subscriber is maintained in the back office 460. For example, when a subscriber changes the channel, this information may be stored at a central warehouse 480. The stored information is made available by business roles and as part of a recommendation engine. Information may be provided to the subscriber based on past viewing information. The subscriber may be presented with information that is provided by an advertiser based on the stored information or the recommendation engine may provide suggestions based on the stored information. In addition, sales/research 462, traffic 464, and content/asset management 466 information may be maintained at the central warehouse 480.

True synchronization may be provided to identify what the subscriber is watching. For example, content identifiers, such as high frequency audio tones, may be embedded into the signal. Then, if the subscriber's phone is turned on, the microphone can listen for the high frequency tones and identify the content that the subscriber is watching. A relationship may thus be associated with what is going on in media consumption by the subscriber.

Other identification methods and systems may be used. For example, audio signal may be blocked. Codes, such as 3D codes, may be used. Further, a cell phone may be used to capture a barcode that is used to identify an object associated with the barcode.

A message processing server 482 may also be provided to receive TXT or SMS messages and to process the received messages. In this instance, the smart-phone 410 does not need to use its Internet capabilities. A commercial for an upcoming show may provide information to the user of the smart phone detailing instructions for the user to record a show by texting "CSI040" to MYDVR (69387), or to request more information regarding a product by texting PRODUCT to ADINFO (234636), etc. The message processing server 482 correlates the TXT message to account information maintained at the back office 460 based on identification of the transmitting device. The message processing server 482 may then responds accordingly. For example, a message may be transmitted by the message processing server 482 so that the show is scheduled on the user's DVR, provides confirmation to the customer, e.g. via text or email message, and/or responds with any error information, e.g. informs the user that registration and/or subscription is required for this service. A specialized application may also be provided on the smart-device to support additional functions (see FIG. 2).

Figure 5:
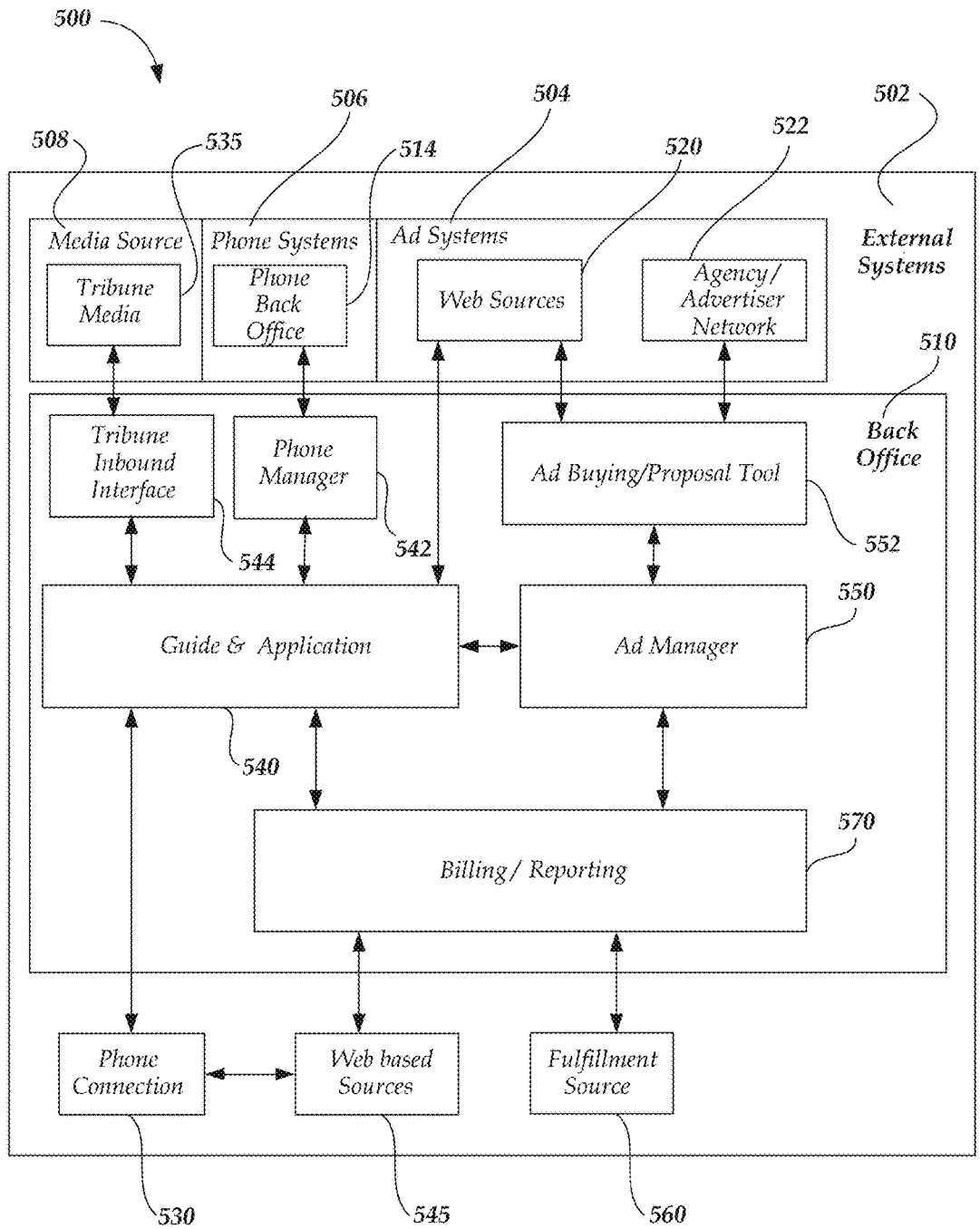
FIG. 5 shows a logical flow of the media management application from the back office view according to one embodiment.

FIG. 5 shows a logical flow provided by the media management application from the back office view 500 according to one embodiment. In FIG. 5, the back office 510 includes a billing/reporting module 570, a guide and application module 540, an advertisement manager 550, an advertisement buying/proposal tool 554, a phone manager 542, and a media source interface 544, e.g., Tribune inbound interface. The external systems 502 include advertisement systems 504, phone systems 506 and media sources 508. Advertisement systems 504 include web sources 520 and an agency/advertiser network 522. The phone systems 506 includes a phone back office 514 and the media source 508 includes a source for listings/media 535, such as the Tribune Media.

The smart phone application connects with the central back office 510 systems to establish an individual consumer profile setting content viewing, media, marketing, coupon, and purchasing preferences. Many homes will have more than one cell phone and/or mobile device, and each mobile device will have associated profile data such that each mobile device may be targeted differently. Each mobile device supplies the back office systems 510 with a level of information that the user is willing to provide to the services provider. The guide and application module 540 can then use the preferences to identify tendencies and begin to provide recommendations.

The consumer uses the smart phone application (via Phone Connection 530) to communicate with the guide and applications module 540, ultimately viewing a "what's on" guide and a recommendations list. Additionally, consumers can then browse the guide on their smart phone to select their shows and schedule them for future viewing. Media listings for all media sources (i.e., Tribune media 535 for cable/Satellite TV, downloadable movie sources, etc) must be accessed and locally stored for the customer's media experience.

The central Ad Manager 550 then begins pushing relevant advertising and the ability to impulse purchase goods and services being shown on television. The advertising may be shown in real time and may enable "1-Click" ordering. Television browsing is provided through a central Web-based Sources 545 function that is enabled via the media management module in the mobile device to allow the customer to shop, connect with friends via $3^{rd}$ party social networking sources (i.e., FaceBook, Twitter, My Space, etc.), use a convenient media organizer to watch their favorite shows in real time with the show, etc. Mobile content and on-screen content are then integrated under one basic platform which readily combines lowest common denominators for phones, televisions, and network programming.

For example, a content provider, such as movie studio, may provide a promotion announcing the release of a new movie showing at a theatre or available for purchase. A subscriber may access an online ticket provider to purchase a movie ticket for the new release. Alternatively, the subscriber may navigate to an online commerce source 560 to purchase the product. Further, some products are not typically advertised on television. However, if such a company releases a new product that has a wide demographic of people who would use the new product, the company may promote the new produce on television and then drive the subscriber to an online commerce site to allow the subscriber to purchase the product.

The system therefore provides a direct or even almost real-time interaction with the advertiser through the web sources 520. In addition, the interaction is not meant to be limited to purchases. Based on the profile of the subscriber, interaction with a mobile device and the ad manager 550 may allow coupons, event tickets, etc. to be provided.

Thus, advertisements may be targeted for the individual based on their profile. However, anyone watching program A may be provided with certain types of advertisements as opposed to only certain types of advertisements being provided to a particular person based on their profile. To prevent disintermediation, an advertisement and related subscriber actions are not passed directly to an online commerce site. Rather, a clearinghouse server is used to deliver the information to the online commerce site. This allows the services provider to maintain information that may be used in negotiations with online commerce sites. Billing and Reporting 570 must support Cost-per-acquisition (CPA) billing model on top of the Cost-per-thousand (CPM) and Cost-per-inquiry (CPI) models.

In addition, high order requirements for fulfillment and advertising connections with $3^{rd}$ parties must include:
  IMDB.com should be available to looking up TV and movie information
  Amazon.com should be available to fulfill offers made on the ads.
  Data collected in the system must be made available for supporting advertiser's media purchases.
  Ad agencies and companies must be able to purchase advertising a in a manner that is suitable to their current buying systems.
  Data may be made available for purchase by other $3^{rd}$ parties (Nielsen type model).
  Allow for TV-commerce to be enabled (Full connectivity to purchase promoted product thru Amazon or advertisers web purchase location)

Figure 6:
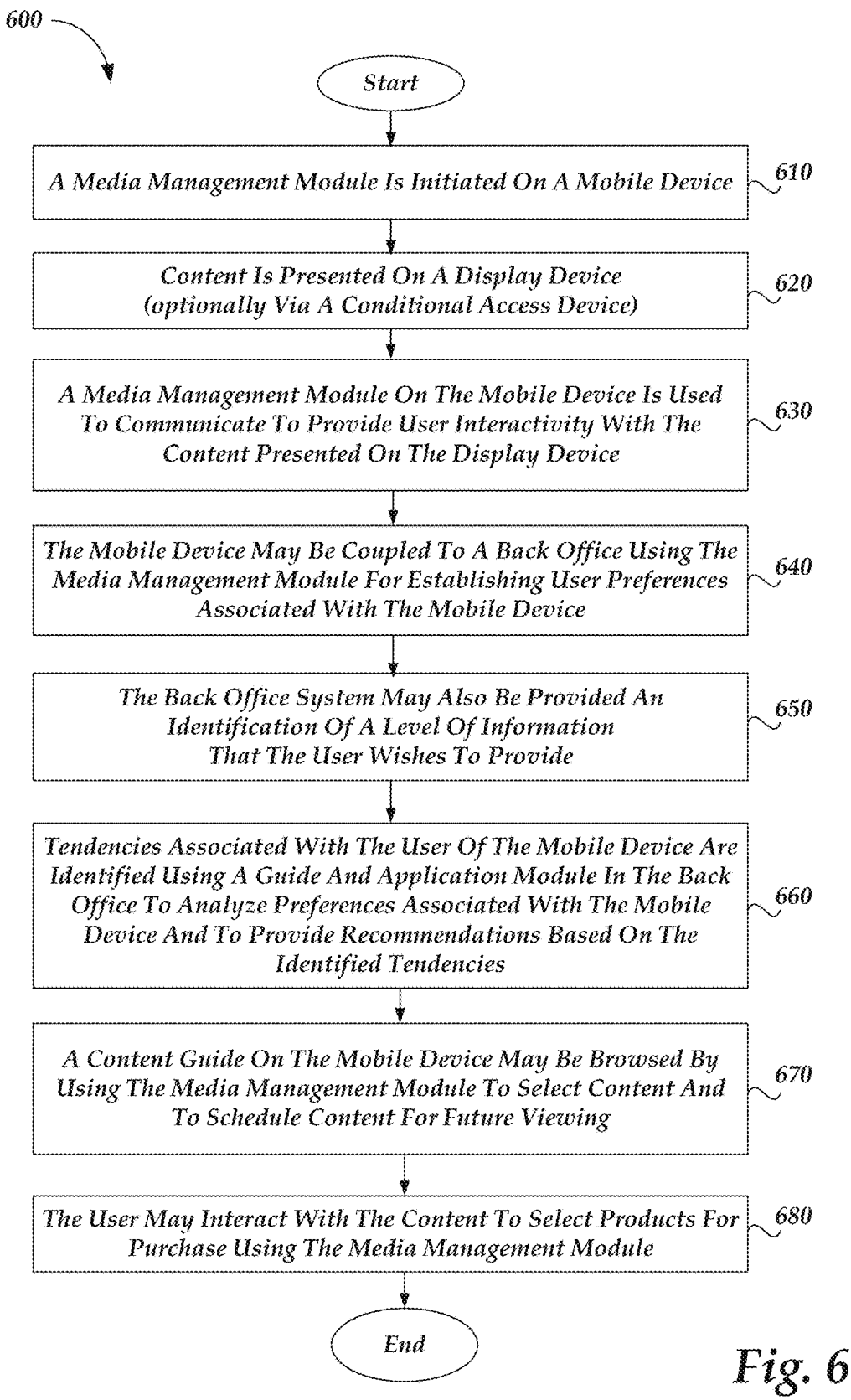
FIG. 6 is a flowchart of a method for providing user interactivity with content provided by a content provider and presented on a display device through use of a mobile device according to an embodiment.

FIG. 6 is a flowchart 600 of a method for providing user interactivity with content provided by a content provider and presented on a display device through use of a mobile device according to an embodiment. One skilled in the art will recognize that the order of the steps shown in FIG. 6 is not meant to be limiting and that an embodiment may include all of the steps or a subset of the steps. Further, the order of at least some of the steps may be modified. In FIG. 6, a media management module is initiated on a mobile device 610. Content is presented on a display device 620. The content may optionally be displayed according to a conditional access device. However, a conditional access device is not necessary for the implementation of an embodiment. A media management module on the mobile device is used to provide user interactivity with the content presented on the display device 630.

The mobile device may be coupled to a back office using the media management module for establishing user preferences associated with the mobile device 640. The back office system may also be provided an identification of a level of information that the user wishes to provide 650. Tendencies associated with the user of the mobile device are identified using a guide and application module in the back office to analyze preferences associated with the mobile device and to provide recommendations based on the identified tendencies 660. A content guide on the mobile device may be browsed by using the media management module to select content and to schedule content for future viewing 670. The user may interact with the content to select products for purchase using the media management module 680.

Figure 7:
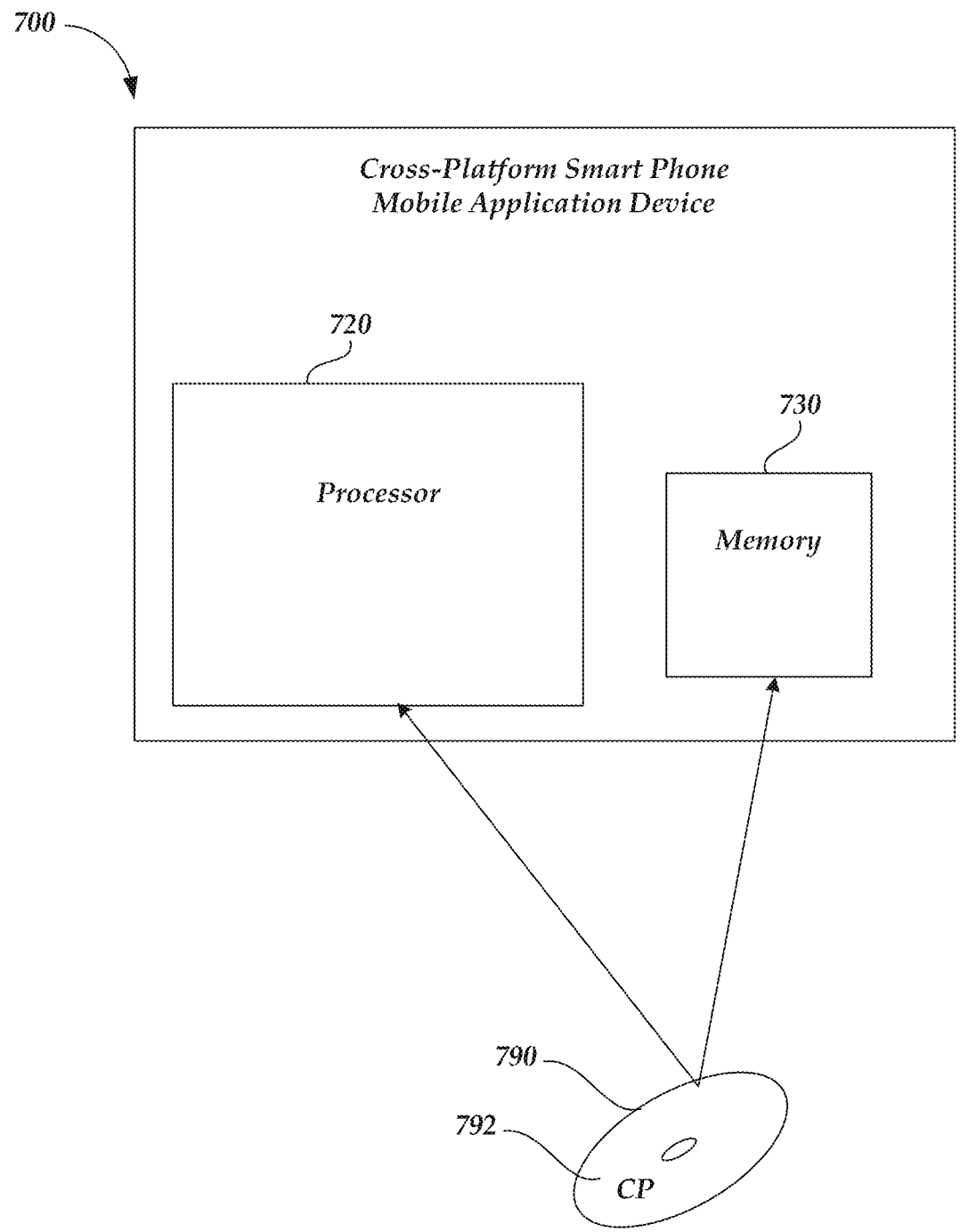
FIG. 7 illustrates a suitable computing environment for implementing a system as described above in FIGS. 1-6 according to an embodiment.

FIG. 7 illustrates a suitable computing environment 700 for implementing a system as described above in FIGS. 1-6 according to an embodiment. In FIG. 7, a cross platform smartphone mobile application device 700 includes a processor 720 and memory 730. Those skilled in the art will recognize that the server 700 may be implemented in a head end module, a session resource manager, and other data/content control devices. Embodiments may also be implemented in combination with other types of computer systems and program modules. Generally, program modules include routines, programs, components, data structures, and other types of structures that perform particular tasks or implement particular abstract data types. By way of example, computer readable media 790 can include computer storage media or other tangible media. Computer storage media 790 includes volatile and nonvolatile, removable and non-removable media implemented in any method or technology for storage of information 792, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 790 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 790 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 720 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 730 thus may store the computer-executable instructions that, when executed by processor 720, cause the processor 720 to implement a cross-platform smart phone mobile application server 700 according to an embodiment of the invention as described above with reference to FIGS. 1-6.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A mobile device comprising:
    memory for storing data; and
    a processor for processing the data, the processor to provide:
        a media management application configured to:
            connect the mobile device to a preferred television viewing and video programming experience for a subscriber that includes content and information services provided by a content provider;
            couple the mobile device to a back office component to establish user preferences for the subscriber;
            allow the mobile device to operate as a remote control as part of the preferred television viewing and video programming experience;
            select one or more media environments to control with the mobile device including using the information services and supplemental content provided with the content and related to the information services, wherein the supplemental content provided with the content includes an electronic code for use in messaging by the mobile device as part of enabling user interactivity that includes information fulfillment requests between the subscriber and the content provider of the information services;
            convert a first type of communication signal to a second type of communication signal in order to communicate with a conditional access device to receive the content, via the conditional access device, from the content provider; and
            receive, on the mobile device, one or more recommendations for additional content for viewing, wherein the mobile device operates to send an electronic message with the electronic code provided with the supplemental content to a message processing server to direct recording, via a digital video recorder, of the additional content associated with the electronic code, wherein the mobile device tracks a television program the subscriber is watching according to a functional relationship with the conditional access device using the second type of communication signal.

2. The mobile device of claim 1, wherein the media management application is further configured to identify time-shifted content and provide interactivity during viewing of the time-shifted content.

3. The mobile device of claim 1, wherein the media management application is further configured to share preferences for viewing recommendations.

4. The mobile device of claim 3, wherein the media management application is further configured to connect to social network groups to share the preferences including media preferences.

5. The mobile device of claim 1, wherein the media management application is further configured to handle a wireless translation as part of the remote control.

6. The mobile device of claim 1, wherein the media management application is further configured to receive group suggestions for suggested content.

7. The mobile device of claim 1, wherein the media management application is further configured to use a return path between the mobile device and a data repository to allow content providers to message at an individual basis.

8. The mobile device of claim 1, wherein the media management application is further configured to control a television, playback device, or set-top box.

9. The mobile device of claim 1, wherein the media management application is further configured to infer crossover referrals to additional content not included as part of a user profile.

10. The mobile device of claim 1, wherein the media management application is further configured to allow a network to enable polling during a live broadcast.

11. The mobile device of claim 1, wherein the media management application is further configured to receive different content according to the real-time viewing of a program or time delayed viewing of the program.

12. The mobile device of claim 1, wherein the media management application is further configured to communicate with a back office to provide subscriber related intelligence.

13. The mobile device of claim 1, wherein the media management application is further configured to allow the subscriber to establish preferences associated with the mobile device, process user data associated with the preferences, and provide the one or more recommendations based on identified subscriber tendencies.

14. The mobile device of claim 1 further configured to identify the content that the subscriber is watching on a display device separate from the mobile device.

15. A non-transitory computer readable medium, including executable instructions which, when executed, operate to:
 connect a mobile device to a preferred television viewing and video programming experience for a subscriber that includes content and information services provided by a content provider;
 couple the mobile device to a back office component to establish user preferences for the subscriber;
 allow the mobile device to operate as a remote control as part of the preferred television viewing and video programming experience;
 select one or more media environments to control using the mobile device including using the information services and supplemental content provided with the content and related to the information services, wherein the supplemental content provided with the content includes an electronic code for use in messaging by the mobile device as part of enabling user interactivity that includes information fulfillment requests between the subscriber and the content provider of the information services;
 convert, via the mobile device, a first type of communication signal to a second type of communication signal in order to communicate with a conditional access device to receive the content, via the conditional access device, from the content provider; and
 receive, on the mobile device, one or more recommendations for additional content for viewing, wherein the executable instructions which, when executed, operate further to send an electronic message with the electronic code provided with the supplemental content, via the mobile device, to a message processing server to direct recording, via a digital video recorder, of the additional content associated with the electronic code, wherein the mobile device tracks a television program the subscriber is watching according to a functional relationship with the conditional access device using the second type of communication signal.

16. The non-transitory computer readable medium of claim 15, including the executable instructions which, when executed, operate further to use a return path between the mobile device and a data repository to allow content providers to message at an individual basis.

17. The non-transitory computer readable medium of claim 15, including the executable instructions which, when executed, operate further to use embedded content identifiers to identify the content that the subscriber is watching.

18. A system comprising:
 a server computer configured with a processor and memory to interact with a mobile device to:
  connect the mobile device to a preferred television viewing and video programming experience for a subscriber that includes content and information services of a content provider;
  receive user preferences for the subscriber from the mobile device;
  receive control commands and feedback from the mobile device;
  provide the information services and supplemental content with the content and related to the information services to the mobile device, wherein the supplemental content provided with the content includes an electronic code for use in messaging by the mobile device as part of enabling user interactivity that includes information fulfillment requests between the subscriber and a content provider of the information services;
  provide one or more recommendations for additional content for viewing to the mobile device;
  receive tracking information from the mobile device for a television program the subscriber is watching according to a functional relationship with a conditional access device, wherein the mobile device converts a first type of communication signal to a second type of communication signal in order to communicate with the conditional access device to receive the content from provided by the content provider; and receive an electronic message with the electronic code provided with the supplemental content from the mobile device to direct recording, via a digital video recorder, of the additional content associated with the electronic code.

\* \* \* \* \*